United States Patent [19]

Hollars et al.

[11] Patent Number: 5,473,431
[45] Date of Patent: Dec. 5, 1995

[54] INTERFEROMETRIC FLYING HEIGHT MEASURING DEVICE INCLUDING AN ADDITION OF A SPACER LAYER

[75] Inventors: Dennis R. Hollars, Los Gatos, Calif.; David P. Danson, Niwot, Colo.

[73] Assignee: Conner Peripherals, Inc., San Jose, Calif.

[21] Appl. No.: 57,054

[22] Filed: Apr. 29, 1993

[51] Int. Cl.$^6$ .................................................. G01B 9/02
[52] U.S. Cl. ........................................ 356/355; 356/357
[58] Field of Search .................................... 356/346, 355, 356/357, 358

[56] References Cited

U.S. PATENT DOCUMENTS

| | | | |
|---|---|---|---|
| 3,653,760 | 4/1972 | Johnson | 355/39 |
| 4,486,096 | 12/1984 | Endo et al. | 356/225 |
| 4,593,368 | 6/1986 | Fridge et al. | 356/357 |
| 4,822,169 | 4/1989 | Distl et al. | 356/364 |
| 5,097,368 | 3/1992 | Lemke et al. | 360/97.02 |
| 5,202,803 | 4/1993 | Albrecht et al. | 360/97.02 |

OTHER PUBLICATIONS

Phase Metrics—"Dynamic Flying Height Tester".
Pacific Precision Labs, Inc. "Digital Flying Height Testing".
Muranushi, Tanaka and Takeuchi—"*Estimation of the Zero–Spacing Error Due to a Phase Shift of Reflected Light in Measuring a Magnetic Head Slider's Flying Height by Light Interference*"—Oct. 8, 1991.
Pacific Precision Lab., Inc.—"*Automatic Digital Flying Height Tester*"—1988.
Johnston, Wayte and Spikes—"*The Measurement and Study of Very Thin Lubricant Films in Concentrated Contacts©*"—Apr. 5, 1990.

Primary Examiner—Samuel A. Turner
Attorney, Agent, or Firm—Fliesler, Dubb, Meyer & Lovejoy

[57] ABSTRACT

A device for accurately measuring flying heights of a read/write head in a disk drive down to zero microinches using interferometry, wherein the flying height of the head above the disk surface is calculated by directing white light to the under side of a rotating disk. An interference pattern is obtained by reflecting a first portion of the light off of the top surface of the disk and reflecting a second portion of the light off of the underside of the read/write head, and then recombining the first and second portions of light. The interference pattern is then input to a spectrophotometer, which creates an intensity profile from which the flying height of the read/write head above the disk may be calculated. A spacer layer is provided on the upper surface of the disk to increase the phase difference of the first and second portions of light, thereby allowing clear interpretation of the interference pattern at extremely low flying heights.

23 Claims, 5 Drawing Sheets

INTERFEROMETRIC FLYING HEIGHT MEASURING DEVICE INCLUDING AN ADDITION OF A SPACER LAYER

BACKGROUND OF THE INVENTION

1. Field of the Invention

The present invention relates to a device for accurately measuring the flying height of a read/write head over a rotating disk or the like, and in particular, a white light interferometric device capable of measuring extremely small flying heights, all the way down to zero microinches.

2. Description of the Related Art

Read/write heads in magnetic storage devices are designed to "fly" over the storage medium. In Winchester-type hard drives, upon start-up of the drive, once the storage disk achieves a certain angular velocity, a cushion of circulating air above the surface of the disk forces the head up off the surface of the disk to thereby achieve a flying height. Having very low flying heights offers several advantages, primary among them is that flying the head very close to the disk surface allows for a high data bit density (i.e., the number of data bits per inch on a data track of the storage disk). Thus, there has been an industry wide push to decrease the height at which read/write heads are maintained over the recording surfaces. In the 1960's flying heights were commonly about 100 microinches ($\mu$"). At present, technological advances in read/write head and disk drive design have allowed the reduction of flying heights to as low as a fraction of a micron.

In order to design and effectively evaluate the operation and performance of a disk drive, it is necessary to determine precisely how high the head flies above the disk, and whether there is any significant variation in the flying height as the disk rotates. When head flying heights were larger, methods such as conventional interferometry using either white or monochromatic light were used to accurately measure the height.

Figure 1A:
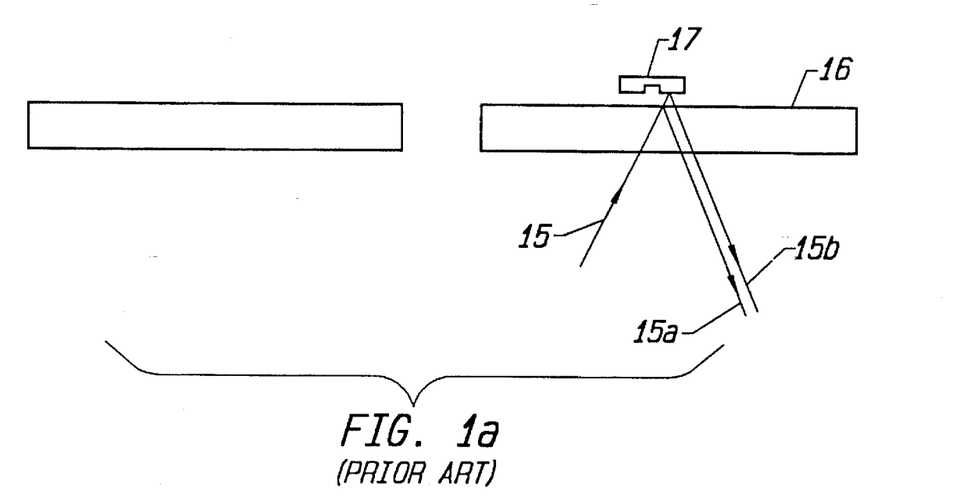
FIG. 1a is a cross sectional view of a head/disk interface having a light source applied thereto in conventional interferometry.

In conventional white light interferometry, as shown in FIG. 1a, a white light source 15 (i.e., the spectrum of all visible frequency electromagnetic waves) is directed through, for example, the bottom of a glass disk 16. A first portion of the light 15a is reflected back down off the upper surface of the disk, while a second portion of the light 15b passes through the disk and is reflected back down off the lower surface of the air-bearing slider 17. While each of the plurality of wavelengths in both the first and second portions of light still have the same phase upon reflection, the phase of the first portion will have shifted with respect to the second portion. Thus, when the first and second portions of light recombine, they form an interference pattern. This interference pattern is visible to the human eye as including at least one color from the visible light spectrum (a common example of an interference pattern in another context is the one seen reflecting off an oil slick on pavement. The visible colors result from an interference pattern due to light waves recombining after bouncing off the top and bottom surfaces of the oil). The colors of the interference pattern resulting from light waves reflecting off the upper surface of a disk and air-bearing slider are uniquely indicative of the height of the air-bearing slider above the surface of the disk.

A problem with such a method is that, while the color of an interference pattern is a good estimation of the frequency of the light waves contained therein, it is extremely difficult with the naked eye to determine the actual frequencies of the many light waves in the pattern. Without known frequencies, the determination of flying height is merely an estimation. This problem has been solved by inputting the interference pattern into a spectrophotometer, which can accurately measure all of the frequencies present in the pattern. The spectrophotometer creates an intensity profile which may then be analyzed by computer algorithm to accurately determine flying height.

Figure 1B:
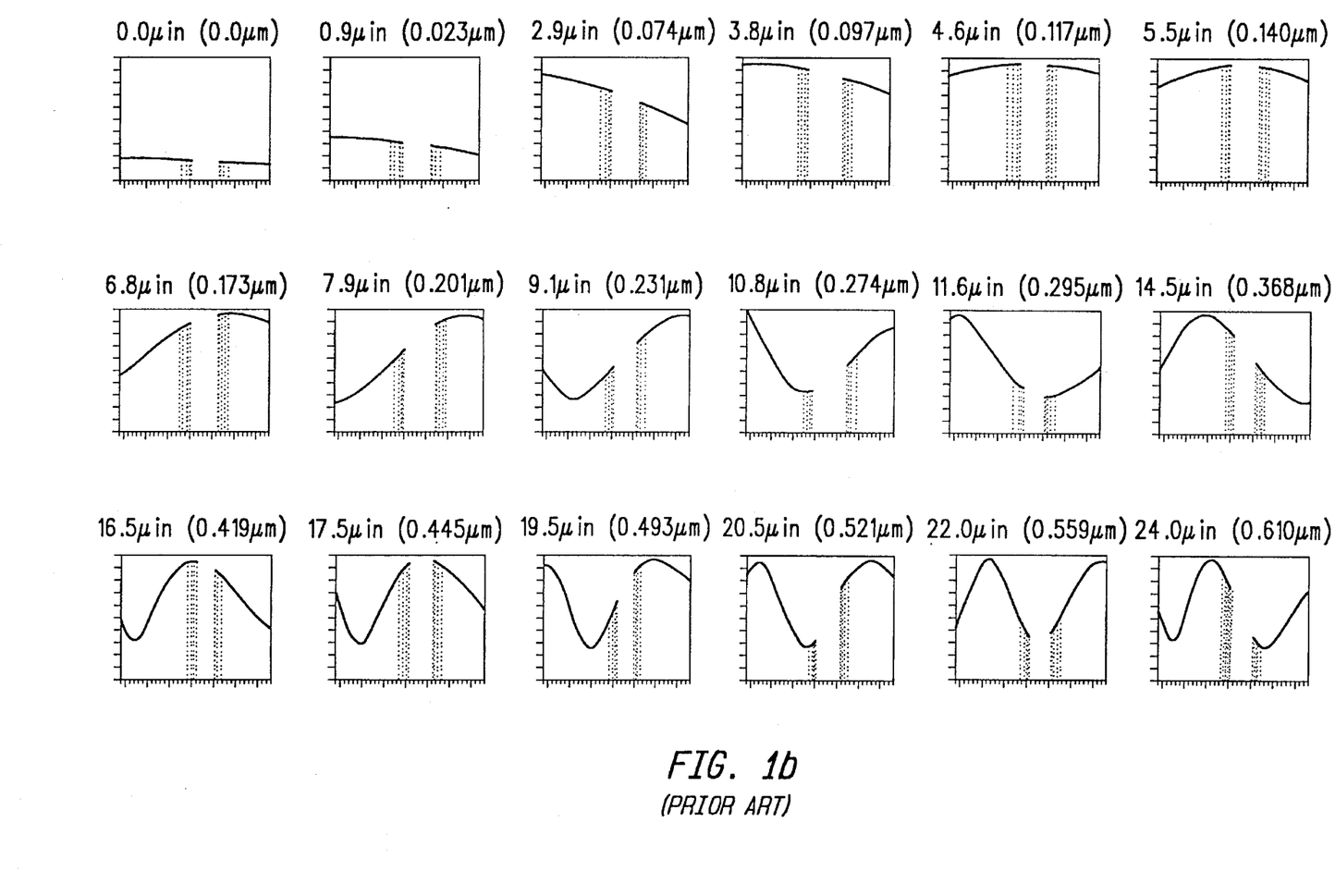
FIG. 1b depicts the intensity profile for several flying heights determined by conventional interferometry.

An example of such an interferometric flying height measuring device is manufactured by Pacific Precision Laboratories Inc. (PPL), 9207 Eton Avenue, Chatworth, Calif. 91311. The PPL device is capable of measuring flying heights of approximately 4–5 microinches ($\mu$"). However, it is extremely difficult with the PPL device and other conventional interferometric flying height measuring devices to measure flying heights smaller than that. With flying heights below 4–5 $\mu$", the phase shift of the first portion of light reflecting off the upper surface of the disk is very slight with respect to the second portion of light reflecting off the air-bearing slider. This slight phase shift yields an interference pattern wherein the intensity of each wavelength is relatively weak, and the intensity profile of all the wavelengths together is a relatively flat curve. FIG. 1b shows several intensity profiles and the flying heights at which they are created. As can be seen, the curves below 4–5 $\mu$" are relatively flat and indistinguishable. It is thus very difficult to accurately determine a flying height from these profiles. Disk drives are presently being developed having flying heights smaller than 4–5 $\mu$" and conventional white light interferometric devices are incapable of accurately measuring these flying heights.

Another disadvantage to conventional interferometric measurement of flying heights is that the surface of the glass disk is not a good reflector, and the intensity of the light reflected off of the slider is much stronger than the intensity of the light reflected from the upper surface of the disk. This results in a weak interference pattern.

Monochromatic interferometry has also been used to measure head flying height. In such systems a monochromatic light wave, from a laser for example, is directed onto a glass disk and air-bearing slider and an interference pattern results as described above. Using a single frequency light source allows an easier measurement of the resulting interference pattern. While monochromatic interferometric measuring devices are capable of measuring extremely small flying heights, they are very expensive. An average cost of such a machine is approximately 5 to 10 times more expensive than white light interferometric flying height measuring devices. Moreover, monochromatic devices are difficult to calibrate and must be used in a highly controlled environment. All of these factors render monochromatic devices impractical for large scale use in production line testing of read/write head flying heights.

SUMMARY OF THE INVENTION

It is therefore an object of the present invention to provide a structure which can accurately measure the flying height of a read/write head above a disk for extremely small flying heights, all the way down to zero microinches.

It is a further object of the present invention to calculate flying height by interferometry utilizing a white light source.

It is still a further object of the present invention to provide a structure as above that is inexpensive and can be easily and inexpensively incorporated into existing flying height measuring devices.

These and other objects of the present invention are solved by the present invention which is directed to a device for accurately measuring flying heights down to zero microinches. The device includes a glass disk having a thin metallic layer on its upper side. A uniform spacer layer is deposited over the metallic layer, which spacer layer may be comprised of quartz or other similar material being transparent to white light. The present invention further includes a read/write head including an air-bearing slider which maintains a flying height above the disk upon spin-up and rotation of the disk. Affixed immediately adjacent to the spacer layer is a slider-like structure comprised of the same or similar material so as to have substantially the same reflective properties as the air-bearing slider.

The flying height of the head above the disk surface is calculated by directing white light to the under side of the rotating disk. The thin metallic layer acts as a beam splitter, reflecting a first portion of the beam back downward, and allowing a second portion of the beam to pass therethrough to be reflected back downward off of the bottom surface of the air-bearing slider. Once reflected, the phase of the second portion of light will have shifted with respect to the first portion, and the two portions will recombine to form an interference pattern. The addition of the spacer layer increases the phase shift in the interference pattern, thereby yielding a pattern including relatively intense and varied wavelengths. This pattern is then input to a spectrophotometer, which creates an intensity profile by way of a graphic representation of the intensity of each wavelength of light within the interference pattern (FIG. 1b). Each intensity profile represents a unique height of the air-bearing slider above the beam splitter layer, which height may be calculated through use of a computer program.

To obtain a calibration reference for the flying height calculation, a second light beam is directed as before to the slider-like structure affixed to the surface of the spacer layer and the height of the slider-like structure above the beam splitter layer (i.e., the thickness of the spacer layer) is calculated. The flying height is then given by the difference in the height of the air-bearing slider above the beam splitter layer and the height of the slider-like structure above the beam splitter layer.

BRIEF DESCRIPTION OF THE DRAWINGS

The invention will now be described with reference to the drawings, in which.

DETAILED DESCRIPTION OF PREFERRED EMBODIMENTS

The present invention relates generally to a structure for accurately measuring extremely small flying heights of read/write heads above rotating storage disks in Winchester-type hard disk drives. The structure utilizes interferometric principals to obtain an interference pattern from a white light source beam directed to the head/disk interface. Spectrophotometry may then be used to exhibit the interference pattern as a wavelength intensity profile uniquely indicative of the flying height.

Referring now to FIGS. 2 through 7, the present invention includes disk assembly 18 having a standard glass disk 20, as used for example in the PPL flying height testing apparatus. The disk 20 may uniformly vary in thickness, but exhibits the property of being transparent to light (the visible spectrum in the band of frequencies from about $3.84 \times 10^{14}$ Hz to about $7.69 \times 10^{14}$ Hz). Disk assembly 18 further includes a thin reflective layer 22 applied to the upper surface of disk 20. As stated in the Background of the Invention, the upper surface of the glass disk 20 is a relatively poor reflector of light, having an index of refraction (n) of approximately 1.5, and the inclusion of layer 22 greatly enhances the reflectivity of light at the upper surface of disk 20. The layer 22 may preferably be comprised of chromium, but any of several materials having a high index of refraction, such as 2.5 for example, could be used. Layer 22 may alternatively be comprised of titanium oxide ($TiO_2$ or $Ti_2O_3$). In addition to a high index of refraction, titanium oxide is an excellent light transmitter with very little internal absorption. Other possible materials from which layer 22 may be formed include several metals, metal alloys and dielectrics. The layer 22 should be chosen such that light incident thereon is split, with a first portion being reflected and a second portion being transmitted. Such materials are commonly referred to as "beam spitters". The beam splitter layer 22 may be applied by thin film application processes such as sputtering or plating. When layer 22 is formed from chromium, the optimal thickness is about 10.0 nanometers and may preferably range from about 8 to 10 nanometers.

Disk assembly 18 further includes a spacer layer 24 provided on the upper surface of beam splitter layer 22. Spacer layer 24 may preferably be comprised of quartz or other material which is transparent to at least visible light frequencies. Spacer layer 24 is uniformly and evenly deposited on beam splitter layer 22 and has a smooth upper surface having sufficient hardness to withstand impact by the read/write head and other shocks. When spacer layer is formed from quartz, the optimal thickness is about 300.0 nanometers. It is understood that this thickness may be increased or decreased over a range such that the interference pattern obtained upon interferometry with a given thickness of spacer layer 24, even for a zero flying height, remains in the visible light spectrum.

Beam splitter layer 22 serves the additional function of providing a strong and sturdy bonding layer between the surfaces of disk 20 and spacer layer 24. The adhesive properties of beam splitter layer 22 provide a more robust disk assembly design than merely disk 20 and spacer layer 24 by themselves.

As explained in greater detail below, when light is applied to the underside of disk assembly 18, a first portion 27a (FIG. 3a) is reflected off of the beam splitter layer 22 and a second portion 27b is reflected off of the underside of slider 36. These portions 27a and 27b recombine to form the interference pattern indicative of the flying height. It is desirable that both portions 27a and 27b be high intensity/high amplitude waves, thereby yielding an interference pattern having clearly defined maxima and minima points.

Figure 3A:
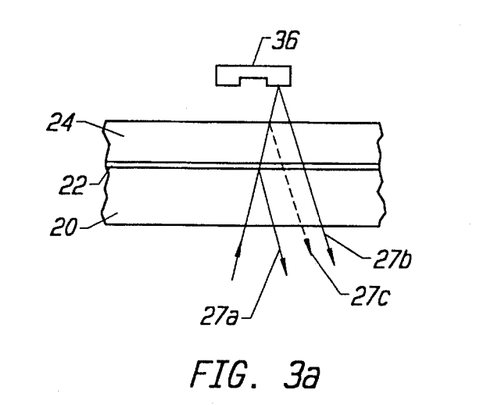
FIG. 3a is an enlarged cross sectional view of the head and disk assembly of the present invention.

However, when light passes from one substance to a second substance, and the substances have different indices of refraction, a certain amount of light will be reflected back through the first substance without entering the second substance. Thus, a portion of light (27c) passing from spacer layer 24 into the fluid between the spacer layer and the slider 36 will be reflected off of the top surface of spacer layer 24 back through the spacer layer 24, thereby diminishing the intensity of portion 27b. When the spacer layer is comprised of quartz and the fluid between the spacer layer and the slider is air, approximately 3% of the light is reflected back.

Figure 3B:
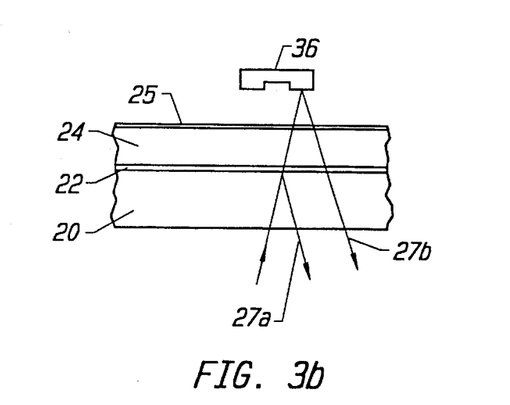
FIG. 3b is an enlarged cross sectional view of an alternative embodiment of the head and disk assembly of the present invention.

In order to avoid this, as shown in FIG. 3b, the upper surface of spacer layer 24 may include a conventional anti-reflective coating 25. Coating 25 greatly reduces the amount of light reflected off of the upper surface of spacer layer 24 and allows that light to pass through to reflect off of the underside of slider 36. In this manner, the intensity of portion 27b is maximized. Coating 25 may additionally have a high hardness to avoid scratches and wear.

The present invention may further operate with liquid as the fluid between the disk surface and the slider. In such a case, the liquid should be chosen, or a dopant added to the liquid, so that the index of refraction of the liquid closely approximates the index of refraction of spacer layer 24. In this way, the amount of light reflected at the boundary between the liquid and the spacer layer is minimized.

Figure 4:
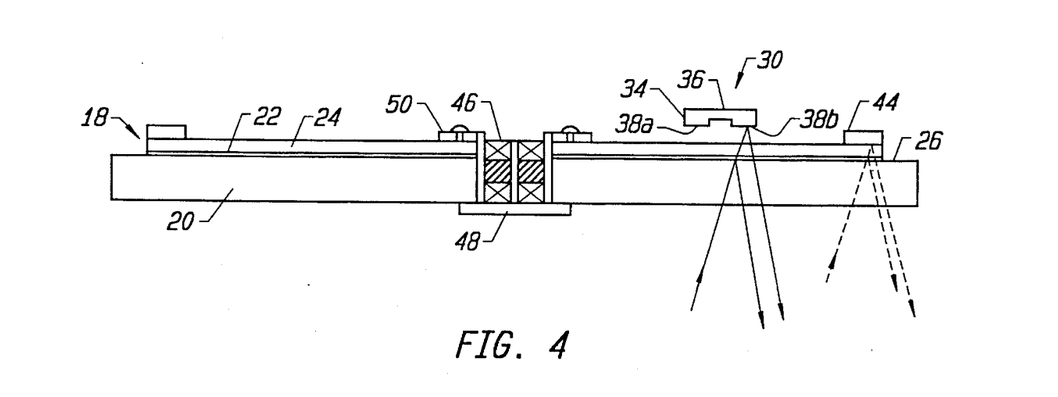
FIG. 4 is a cross sectional view along line 4—4 of the head and disk assembly shown in FIG. 2 further showing a light source applied thereto in conventional interferometry.
Figure 5A:
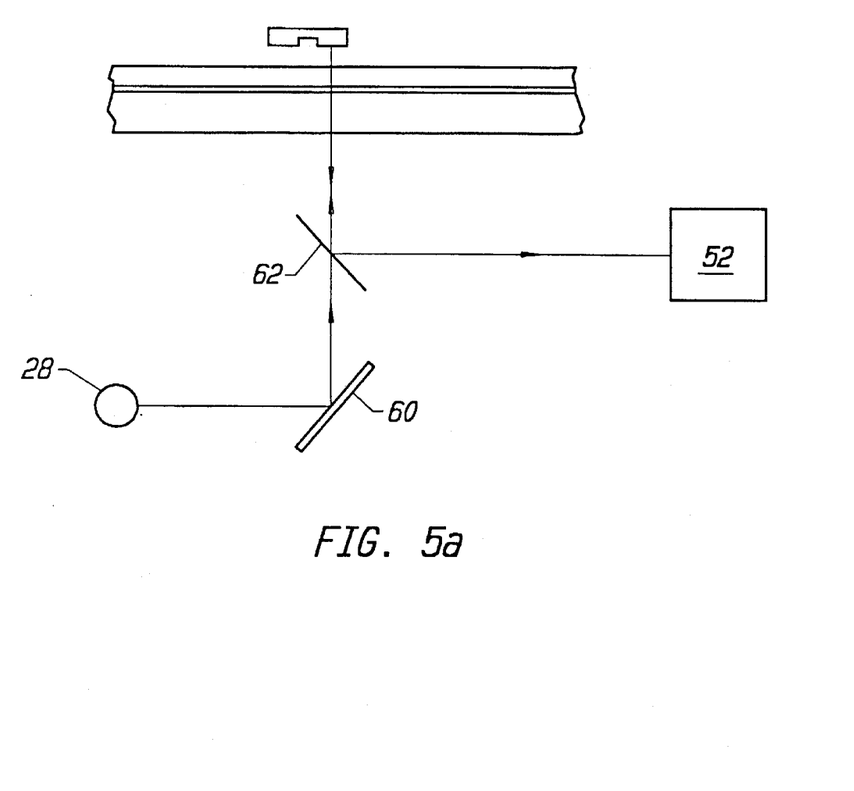
FIG. 5a is a schematic representation of the structure according to the present invention for obtaining an interference pattern.
Figure 5B:
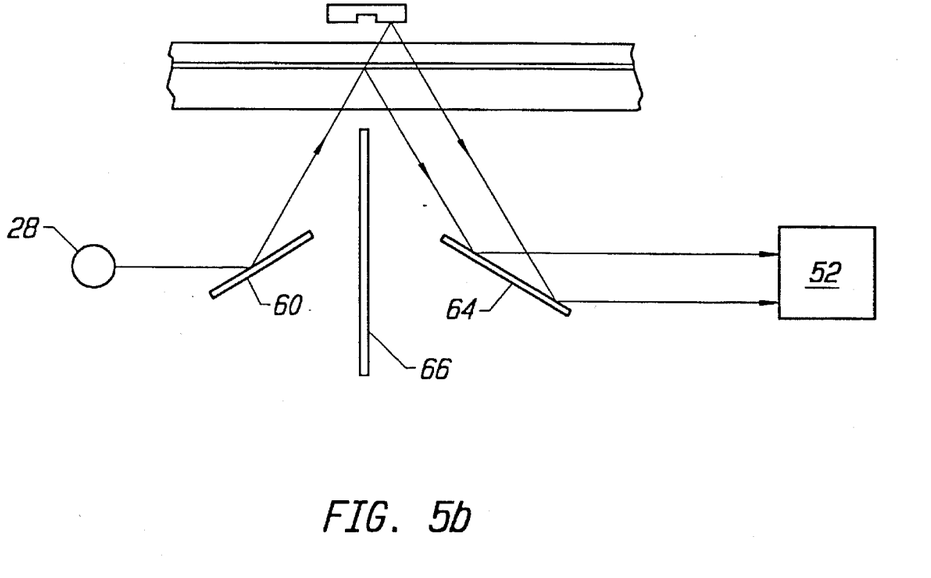
FIG. 5b is a schematic representation of an alternative structure according to the present invention for obtaining an interference pattern.

As shown in FIG. 4, disk 20 is provided with lamp reference section 26, preferably on the outer diameter of the disk 20, which section is bare and not coated with either beam splitter layer 22 or spacer layer 24. The purpose of lamp reference section 26 is to provide a calibration of the lamp 28 (FIGS. 5a and 5b). The intensity of lamp 28 may vary slightly on any given day, and this variation, if any, must be determined prior to producing the interference pattern. Therefore, prior to measuring flying height, light from lamp 28 is directed onto section 26. The amount of light reflecting off section 26 is measured and, as the index of refraction and reflectivity of section 26 are known, the intensity of lamp 28 may thus be calculated.

Lamp 28 may preferably be a conventional mercury vapor lamp, halogen lamp or other similar light source. The light emitted from the lamp is focused by use of optical lenses (not shown) so that the light incident on the disk is approximately 1–2 mm in diameter. It is understood that the light source may be focused by other means and into other diameters.

A read/write head 30 may be supported by actuator assembly 32 to position the head with respect to the disk assembly 18. The read/write head 30 may alternatively be mounted to a support arm which is controlled by a controller 54 (FIG. 6) to move in an X-Y plane parallel to the disk 20 surface. With either the actuator or support arm, controller 54 moves the head 30 with respect to the surface of disk assembly 18 in either an arcuate path (including skew angle) or a linear path. Read/write head 30 includes transducer 34 and air-bearing slider 36. In a working disk drive, the transducer would read data from and write data to a storage disk in response to signals from the control circuitry. In the present invention, the transducer 34 does not read or write data, but rather is present to ensure that flying height test conditions are identical to conditions under which a read/write head would fly over a disk during normal operation of a disk drive.

Figure 2:
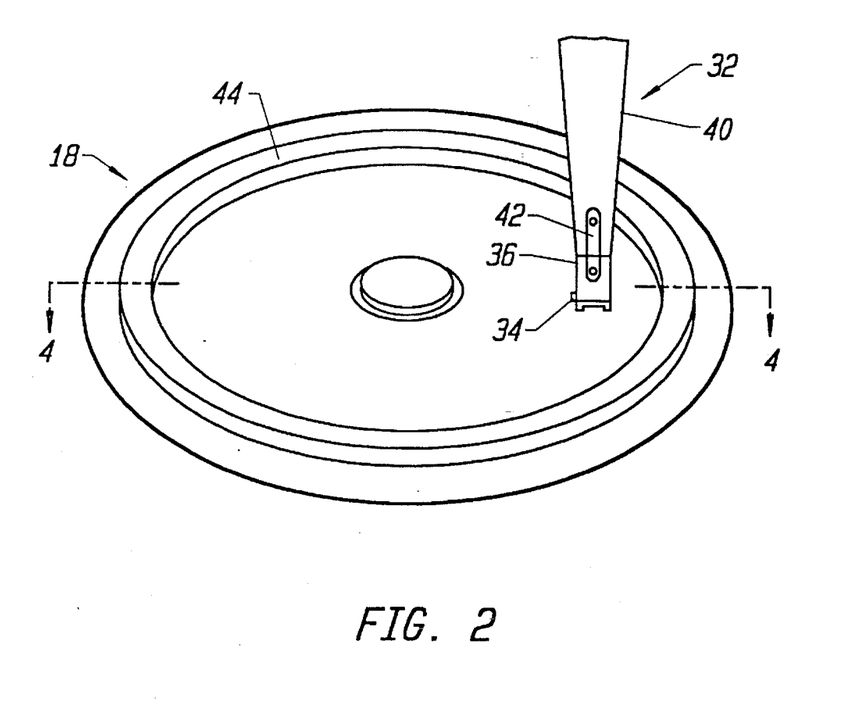
FIG. 2 is an isometric view of a head, actuator assembly and disk assembly according to the present invention.

As shown in FIGS. 2 and 4, transducer 34 is mounted on air-bearing slider 36, which is in turn mounted on and supported by actuator assembly or support arm 32. The configuration of air-bearing slider 36 in general includes side rails 38a and 38b extending rearward from the forward edge of slider 36. As the present invention is adopted to measure flying height in any of several head designs, it is understood that the slider 36 may be configured in several different ways. For example, rail 38a and/or 38b may include a wedge-shaped taper at its leading or trailing edge. Additionally, the width and the height of rail 38a and/or rail 38b may vary. Further, rail 38a and/or 38b may include a transverse pressurization contours, as described and claimed in U.S. Pat. No. 4,673,996 to White. With transverse pressurization contours, grooves or contours are cut along the length of one or both of rails 38a and 38b (i.e., extending rearwardly from the forward edge of the slider 36) at the inside and/or outside of both rails. Slider 36 may be formed from titanium carbide or a titanium carbide/aluminum oxide composition, or some other opaque, reflective material from which conventional sliders are formed. Rails 38a and 38b of slider 36 are smooth so as to provide both a uniform flying height and uniform reflective properties.

Actuator assembly or support arm 32 includes arm 40 which supports flexure 42 on which read/write head 30 is mounted. Arm 40 biases read/write head 30 toward the surface of the disk assembly 18 with a gram loading which varies, depending on the design of the disk drive being tested. Flexure 42 serves to support the bottom surface of rails 38a and 38b in a plane parallel to the upper surface of quartz spacer layer 24.

The linear velocity of the rotating disk assembly 18, as seen by the head 30, varies radially on disk assembly 18 according to the relationship that $v = \omega \times r$, where v equals the linear velocity as seen by the head, $\omega$ equals the angular velocity of the disk assembly 18, and r equals the radius from the axis of rotation of disk assembly 18 at which the head 30 is located. Thus, the linear velocity of the disk assembly 18 as seen by the head 30 when located at the outer portions of the disk would be greater than that seen by the head 30 when located at the inner portions of the disk. The linear velocity of the disk will effect flying height such that the head will fly higher above the disk at faster velocities. Therefore, by adjusting the position of the head 30 across the surface of disk assembly 18, different flying heights may be measured.

Affixed to upper surface of the quartz spacer layer 24 is a slider-like structure 44. Slider-like structure 44 may be applied to the quartz spacer layer 24 by known thin film application methods, such as sputtering or plating, while the remainder of the surface of spacer layer 24 is shielded. The material of structure 44 is preferably chosen to be the same as or to have substantially the same reflectivity as the slider 36, thereby optically representing an air-bearing slider in permanent, direct contact with the exposed upper surface of the spacer layer 24. It is, however, contemplated that for certain flying height tests, the slider structure 44 may have a greater reflectivity than the slider 36.

The structure 44 is preferably provided in an annular fashion at, and concentric with, the outer diameter of the spacer layer 24. The material utilized in forming the structure 44 may be titanium carbide, a titanium carbide/aluminum oxide composition or any other material that has a surface reflection characteristic substantially equivalent to that of the air-bearing slider 36 under test. Such sliders are generally optically opaque and reflect approximately 19 to 20% of the light incident thereon. As will be explained in greater detail below, the purpose of slider-like structure 44 is to provide a zero flying height reference height against which the height of the slider 36 above beam splitter layer 22 is to be offset to obtain the actual flying height of slider 36.

In conventional flying height testing devices, the zero reference flying height is calculated by landing the head on the disk at several different locations and taking the average. In addition to the difficulties in calculating flying heights smaller than 4 μ" discussed above, this method is time consuming and asperities on the surface of the disk or read/write head prevent an integral contact of the head with the disk surface, thereby preventing a true zero reference measurement. By depositing slider structure 44 directly on the disk, a quick and accurate zero reference measurement may be obtained by spinning the disk and taking several measurements. Moreover, as there is an smooth, integral contact of the slider structure 44 with the disk surface, the measurement is a true zero reference measurement.

The disk assembly 18 may be rotated by a conventional spin motor 46, which may be provided to spin at a constant or variable speed. As stated above, the speed of the disk assembly 18 as seen by the head 30 varies according to the radial position of the head 30 with respect to the disk assembly 18. However, as it may be desired to vary the speed of the disk even further, it is within the scope of the invention to provide a variable speed spin motor. Disk assembly 18 may preferably be mounted on hub 48 by disk clamp 50. The hub 48 is mounted circumferencially about spin motor 46 so that spin motor 46 is located at the center of disk assembly 18.

In operation, the light beam from lamp 28 is initially directed onto lamp reference section 26 to calibrate lamp 28 as described above. Once lamp 28 is properly calibrated, the light beam is directed from the underside of glass disk 20 toward the read/write head 30. The diameter of the beam may be sufficiently narrowed to focus the beam on either side rail 38a or 38b of slider 36. As shown in FIGS. 3a, 3b and 4, layer 22 acts as a beam splitter, such that a first portion of the light beam passes through glass disk 20 and is reflected back downward off of the surface of beam splitter layer 22. A second portion of the light beam passes through the beam splitter layer 22 and is reflected back downward off one of the rails 38a or 38b of slider 36.

Varying the thickness of beam splitter layer 22 will alter the ratio of the amount of light it reflects versus the amount of light it transmits. A relatively thick beam splitter layer 22 will reflect a large percentage of light incident thereon in comparison to the amount of light transmitted. Similarly, a relatively thin spacer layer 22 will transmit a large percentage of light in comparison to the amount of light reflected. The thickness of spacer layer 22 is optimally chosen such that the intensity of the first portion of light (27a, FIGS. 3a and 3b) upon emergence from the bottom surface of disk 20 is substantially equal to the intensity of the second portion of light (27b, FIGS. 3a and 3b) upon emergence from the bottom surface of disk 20. The first and second portions of light will be out of phase with each other and will recombine to form an interference pattern. An optimal thickness of beam splitter layer 22 may be obtained through varying the thickness of the beam splitter layer until a maximum intensity interference pattern is obtained.

Figure 6:
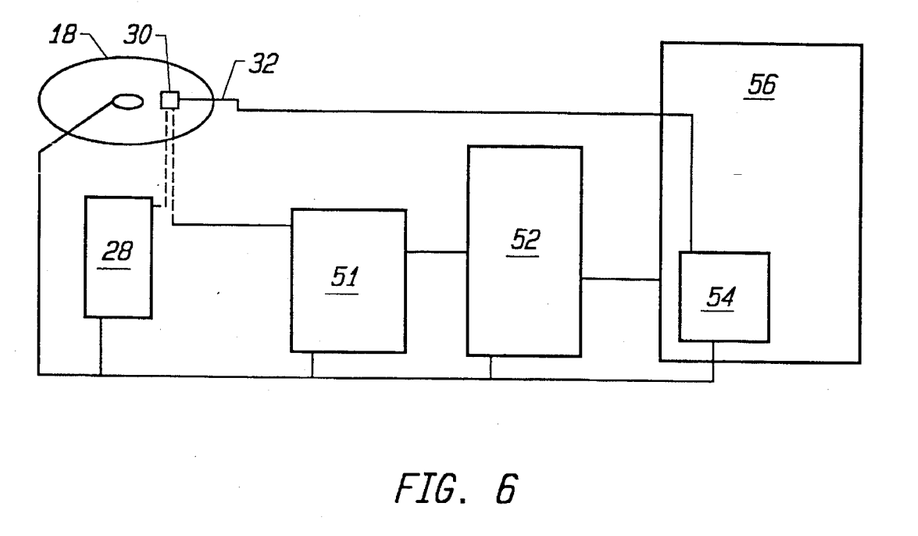
FIG. 6 is a schematic illustration of the system of the present invention.

The pattern resulting from the phase difference is uniquely representative of the height of the rails 38a and 38b over the beam splitter layer 22. As white light is used, light of all different visible wavelengths is reflected off both beam splitter layer 22 and slider 36 and combine to form the interference pattern. Therefore, in order to ascertain the presence and intensity of the various visible wavelengths in the pattern, it is input into a conventional spectrophotometer 52, such as that utilized in the interferometric flying height measuring device manufactured by Pacific Precision Laboratories. As shown in FIG. 6, after emergence from disk assembly 18, the interference pattern is sensed by pattern detector 51 in a known fashion. Pattern detector 51 then conveys the interference pattern to the spectrophotometer 52. The spectrophotometer 52 is able to determine the intensity of each wavelength of light in the interference pattern to produce a wavelength intensity profile (such as those shown in FIG. 1b). The inclusion of the spacer layer 24 increases the phase difference between the light reflected off of the beam splitter layer 22 and the light reflected off of the slider 36. Therefore, the resultant interference pattern will include relatively varied and intense wavelengths which are easily measured.

The intensity profile of the interference pattern is uniquely representative of the height of the side rails 38a and 38b above beam splitter layer 22. This height may be determined by a modification of a conventional method. One such conventional method is by computer algorithm as exemplified by the interferometric flying height measuring device manufactured by Pacific Precision Laboratories. In such a system, a program in computer 56 analyzes the shape, including the maxima and minima, of the intensity profile and outputs a corresponding height. In the present invention, this program is modified to take into account the thickness of spacer layer 24. Due to the spacer layer 24, the intensity profile for even very small flying heights will exhibit clearly recognizable and precisely measurable maxima and minima from which the height of the slider 36 above the beam splitter layer 22 may be accurately calculated by the computer program.

After the height of the slider 36 above the beam splitter layer 22 is determined, the process is repeated directing the light beam off of the slider-like structure 44. As with the air-bearing slider, a portion of the light is reflected back down off of the beam splitter layer 22 and a second portion passes through beam splitter layer 22 and is reflected back down off of the underside of slider-like structure 44. The interference pattern thus obtained is input into spectrophotometer 52 and an intensity profile as described above is obtained. This profile is analyzed by the computer program according to the present invention as described above to determine the height of the slider-like structure 44 above the beam splitter layer 22. As the beam splitter layer 22 is in immediate contact with spacer layer 24, which is in turn in immediate contact with the slider-like structure 44, the height of the slider-like structure 44 above beam splitter layer 22 thus obtained will simply be the thickness of the spacer layer 24. By subtracting this height from the height of the air-bearing slider above the beam splitter layer 22, the height of the air-bearing slider above the upper surface of the spacer layer 24 may thus be obtained. This is the flying height of the head 30 above disk assembly 18.

As shown in FIG. 5a, the angle of incidence of the light beam with respect to glass disk (i.e., the angle the light beam forms with an axis perpendicular to the plane in which disk 20 resides) may be 0°. In this embodiment, light from lamp 28 is reflected off of mirror 60, through a beam splitter 62, and onto the underside of disk assembly 18. Thereupon, the light is split and recombined as described above to form an interference pattern. The pattern is then reflected off of beam splitter 62 and forwarded to the spectrophotometer 52.

One disadvantage of the embodiment described with reference to FIG. 5a is that a portion of the interference pattern reflected from the disk assembly 18 and slider 36 passes back through beam splitter 62. Therefore, the portion of the interference pattern reflected toward the spectrophotometer 52 is of moderately low intensity. However, this problem is alleviated in the embodiment shown in FIG. 5b. In this embodiment, the angle of incidence of the light is some angle other than 0°. Light from lamp 28 is reflected off of mirror 62 onto the underside of disk assembly 28. Thereupon, the light is separated and recombined as explained above to form the interference pattern which is forwarded to the spectrophotometer 52 by way of mirror 64. Baffle 66 is included to ensure that the interference pattern is unaffected by the light from lamp 28 prior to its entry through disk assembly 18.

As shown in FIG. 6, the present invention includes a controller 54 for controlling the operation and interaction of the head 30 and disk assembly 18. The controller 54 includes control circuitry for generating and sending control signals to the actuator assembly or support arm 32 so as to position head 30 with respect to disk assembly 18. Moreover, the controller 54 may include control circuitry for generating and sending control signals to the spin motor 46 so as to vary and control the speed at which disk assembly 18 rotates. In an alternative embodiment, the controller 54 may be modified to control the intensity, direction and duration of the light source from lamp 28. The controller 54 may also be modified to control interaction of the spectrophotometer 52 with the rest of the system; namely the controller 54 may control pattern detector 51 to input the interference pattern to the spectrophotometer 52 and may further control the transfer of the intensity profile from the spectrophotometer 52 to the computer 56 for determination of height from the intensity profile. Controller 54 may preferably be part of computer 56. A user may input system parameters to controller 54 through a keyboard or similar structure included as part of computer 56.

Figure 7A:
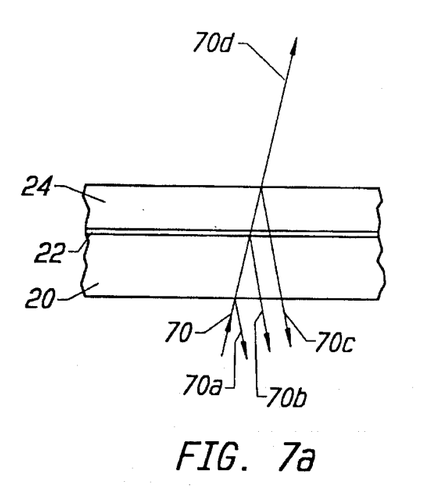
FIG. 7a is an enlarged cross sectional view of a disk assembly according to an alternative embodiment of the present invention.
Figure 7B:
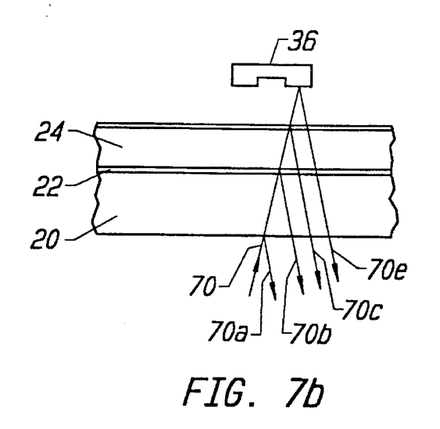
FIG. 7b is an enlarged cross sectional view of a head and disk assembly according to an alternative embodiment of the present invention.

In an alternative embodiment of the present invention shown in FIGS. 7a and 7b, the flying height of slider 36 above disk assembly 18 may be accurately calculated by obtaining and storing a first interference pattern without the slider 36 in place, and then obtaining a second interference pattern with slider 36 in place. The difference between the first and second interference patterns will be uniquely indicative of the height of the slider 36 above the disk assembly 18. Specifically, with reference to FIG. 7a, a light 70 from lamp 28 is applied to the underside of disk assembly 18 as described above. Light is reflected downward at each boundary in disk assembly 18. Namely, portion 70a is reflected off of the underside of disk 20, portion 70b is reflected off of the beam splitter layer 22, and portion 70c is reflected off of the upper surface of spacer layer 24. (Although omitted for clarity in FIGS. 3–5, a portion of light from lamp 28, portion 70a in FIG. 7a, will always be reflected off of the underside of disk 20 without entering the disk assembly 18).

In this embodiment, it is desired to maximize the intensity of portions 70b and 70c reflecting off of the layer 22 and the upper surface of spacer layer 24, respectively. Therefore, no anti-reflective coating would be applied to the upper surface of spacer layer 24. Moreover, a baffle or anti-reflective coating applied to the bottom surface of disk 20 may be used to minimize the intensity of portion 70a relative to portions 70b and 70c. As there is no slider, portion 70d continues unreflected. The interference pattern due to portions 70a, 70b and 70c is then analyzed by spectrophotometer 52 and the results stored in computer 56.

Thereafter, as shown in FIG. 7b, slider 34 is maintained over disk assembly 18 and light 70 is applied from lamp 28 as before. Now, an additional portion 70e will be reflected back downward off of the slider 36. The interference pattern thus obtained from portions 70a, 70b, 70c and 70e is input to spectrophotometer 52 and the results are compared against the results obtained with the set-up shown in FIG. 7a. The difference in the two interference patterns will be as result of the additional component 70e reflecting off of the underside of slider 36. The two results may be analyzed by a computer algorithm in computer 56 to thus yield the flying height of slider 36 above disk assembly 18.

As can be seen from the above description of the embodiments of the present invention, extremely small flying heights may be measured using relatively inexpensive white light interferometry techniques. In fact, the present invention is capable of measuring flying heights as small as zero microinches. This is of course the case where the air-bearing slider 36 is resting on the surface of the rotating disk assembly 18 and both the height of the air-bearing slider 36 and slider-like structure 44 above the beam splitter layer 22 are the same. In practice, disk drives are not designed to have a zero microinch flying height as the wearing friction between the head and disk would quickly cause failure of the disk drive. But it is the desire of disk drive and computer designers to approach zero microinches, and as advances in technology allow for further decreases in flying height in the future, the present invention may be utilized to accurately measure at any flying height.

Although the invention has been described in detail herein, it should be understood that the invention is not limited to the embodiments herein disclosed. For example, although an important feature of the present invention, it is understood that beam splitter layer 22 may be omitted so that the upper surface of disk 20 operates as the beam splitter. Furthermore, it is understood that the fluid on which the head is maintained over the disk may either be a cushion of air, as in conventional disk drives, or a cushion of liquid, as disclosed in U.S. Pat. No. 5,097,368 to Lemke. Where flying height measurements are made in the presence of a liquid, the computer program in computer 56 which analyzes the intensity profile is modified to take into account the index of refraction of the liquid. Various other changes, substitutions and modifications may be made to the present invention by those skilled in the art without departing from the spirit or scope of the invention as described and defined by the appended claims.

We claim:

1. A device for measuring a flying height of a read/write head above a rotating disk, comprising:

a means for providing a light;

an air-bearing slider for supporting the read/write head on a cushion of fluid over the disk, said air-bearing slider having an underside and the disk including a beam splitter layer and a spacer layer provided on a top surface of said beam splitter layer;

an interference pattern resulting from a phase difference in a plurality of electromagnetic wavelengths emanating from said light providing means, said interference pattern being formed by a first portion of said light reflecting off of said beam splitter layer and a second portion of said light passing through said beam splitter layer and reflecting off of said underside of said air-beating slider to thereupon recombine with said first portion of said light;

wherein said spacer layer is provided to increase said phase difference so that each electromagnetic wavelength in said plurality of electromagnetic wavelengths is within the visible spectrum;

and wherein said interference pattern is uniquely representative of a height of said air-bearing slider above said beam splitter layer.

2. A device as recited in claim 1, further comprising:

a slider structure having a bottom surface in contact with a top surface of said spacer layer; and a reference interference pattern resulting from interferometry by a third portion of said light reflecting off of said beam splitter layer and a fourth portion of said light passing through said beam splitter layer and reflecting off of said bottom surface of said slider structure to thereupon recombine with said third portion of said light;

wherein said reference interference pattern is uniquely representative of a thickness of said spacer layer.

3. A device as recited in claim 2, further comprising:

means for determining said height of said air-bearing slider above said beam splitter layer from said interference pattern and for determining said thickness of said spacer layer from said reference interference pattern.

4. A device as recited in claim 3, wherein the flying height of the read/write head is the difference between said height and said thickness.

5. A device as recited in claim 2, wherein said bottom surface of said slider structure has similar reflective properties to said underside of said air-bearing slider.

6. A device as recited in claim 1, wherein said beam splitter layer has a thickness of approximately 10 nanometers.

7. A device as recited in claim 1, wherein said spacer layer has a thickness such that said interference pattern is in the visible light spectrum for a zero flying height.

8. A device as recited in claim 7, wherein said spacer layer has a thickness of approximately 300 nanometers.

9. A device as recited in claim 1, further comprising an anti-reflective material on an upper surface of said spacer layer for reducing the reflection of said light at said upper surface of said spacer layer.

10. A device as recited in claim 1, wherein the disk further comprises a transparent disk substrate having a top surface, said beam splitter layer provided on said top surface.

11. A device as recited in claim 1, wherein said beam splitter layer is comprised of a metallic substance.

12. A device as recited in claim 11, wherein said metallic substance is chromium.

13. A device as recited in claim 1, wherein said beam splitter layer is comprised of a dielectric.

14. A device as recited in claim 1, wherein said beam splitter layer is comprised of titanium oxide.

15. A device as recited in claim 1, wherein said spacer layer is comprised of quartz.

16. A device as recited in claim 3, said determining means comprising:

a spectrophotometer for obtaining a first wavelength intensity profile of said interference pattern and for obtaining a second wavelength intensity profile of said reference interference pattern; and computer means for analyzing said first wavelength intensity profile to determine said height and for analyzing said second wavelength intensity profile to determine said thickness.

17. A device for measuring a flying height of a read/write head above a rotating disk, comprising:

a means for providing a light;

an air-bearing slider for supporting the mad/write head on a cushion of fluid over the disk, said air-bearing slider having an underside;

the disk including:

a beam splitter layer, and a spacer layer provided on a top surface of said beam splitter layer;

an interference pattern resulting from a phase difference in a plurality of electromagnetic wavelengths, said interference pattern being formed by a first portion of said light reflecting off of said beam splitter layer and a second portion of said light passing through said beam splitter layer and reflecting off of said underside of said air-bearing slider to thereupon recombine with said first portion of said light;

wherein said spacer layer is provided to increase said phase difference so that each electromagnetic wavelength in said plurality of electromagnetic wavelengths is within the visible spectrum;

and wherein said interference pattern is uniquely representative of a height of said air-bearing slider above said beam splitter layer;

a slider structure having a bottom surface in contact with a top surface of said spacer layer;

a reference interference pattern resulting from interferometry by a third portion of said light reflecting off of said beam splitter layer and a fourth portion of said light passing through said beam splitter layer and reflecting off of said bottom surface of said slider structure to thereupon recombine with said third portion of said light;

wherein said reference interference pattern is uniquely representative of a thickness of said spacer layer;

means for determining said height of said air-bearing slider above said beam splitter layer from said interference pattern and for determining said thickness of said spacer layer from said reference interference pattern;

wherein the flying height of the read/write head is the difference between said height and said thickness.

18. A method of determining a flying height of a read/write head above a rotating disk, comprising the steps of:

directing a light toward the disk, the disk having a beam splitter layer and a spacer layer thereon;

obtaining a first interference pattern due to the reflection of said light off of said beam splitter layer and a top surface of said spacer layer;

storing a digital representation of said first interference pattern in a computer memory;

maintaining the read/write head over the disk on a cushion of fluid;

directing said light toward the disk a second time;

obtaining a second interference pattern due to the reflection of said light off of said beam splitter layer, said top surface of said spacer layer and an underside of said read/write head;

comparing said first interference pattern to said second interference pattern to obtain a difference between said patterns;

calculating by computer program the flying height of the read/write head above the disk based on said difference.

19. A method of determining a flying height of a head above a rotating disk having a beam splitter layer thereon, comprising the steps of:

directing a light toward the disk;

obtaining an interference pattern by the steps of:
reflecting a first portion of said light off of the beam splitter layer,
transmitting a second portion of said light through the beam splitter layer,
increasing a path length of said second portion of said light by passing said second portion of said light through a spacer layer, and
reflecting said second portion of light off of an underside of the head to thereupon recombine with said first portion of said light;

determining a first height of said underside of the head above the beam splitter layer by analysis of said interference pattern;

obtaining a reference interference pattern by the steps of:
reflecting a third portion of said light off of the beam splitter layer,
transmitting a fourth portion of said light through the beam splitter layer, and
reflecting said fourth portion of light off of an upper surface of said spacer layer to thereupon recombine with said third portion of said light; and determining a second height of said upper surface of said spacer layer above the beam splitter layer by analysis of said reference interference pattern.

20. A method recited in claim 19, further comprising the steps of:

calculating the flying height of said head above said upper surface by the difference between said first height and said second height.

21. A device for measuring a flying height of a head above a rotating disk by forming an interference pattern indicative of flying height, comprising:

a means for providing a light;

a bearing means for supporting the head on a cushion of fluid over the disk, said bearing means having an underside and the disk including a beam splitter layer and a spacer layer provided on a top surface of said beam splitter layer;

the interference pattern resulting from a phase difference in a plurality of electromagnetic wavelengths emanating from said light providing means, the interference pattern being formed by a first portion of said light reflecting off of said beam splitter layer and a second portion of said light passing through said beam splitter layer and reflecting off of said underside of said bearing means to thereupon recombine with said first portion of said light.

22. A method of determining a flying height of a read/write head over a rotating disk, comprising the steps of:

directing a light toward the disk, the disk having a beam splitter layer thereon;

obtaining an interference pattern by the steps of:
reflecting a first portion of said light off of said beam splitter layer,
transmitting a second portion of said light through said beam splitter layer,
increasing a path length of said second portion of said light by passing said second portion of said light through a spacer layer, and
reflecting said second portion of light off of an underside of the read/write head to thereupon recombine with said first portion of said light;

determining a first height of said underside of said read/write head above said beam splitter layer by analysis of said interference pattern;

obtaining a reference interference pattern by the steps of:
reflecting a third portion of said light off of said beam splitter layer,
transmitting a fourth portion of said light through said beam splitter layer, and
reflecting said second portion of light off of an upper surface of said spacer layer to thereupon recombine with said third portion of said light; and determining a second height of said upper surface of said spacer layer above said beam splitter layer by analysis of said reference interference pattern.

23. A method as recited in claim 22, further comprising the steps of:

calculating the flying height of said read/write head above said upper surface by a difference between said first height and said second height.

* * * * *